United States Patent [19]
Clifton

[11] Patent Number: 5,787,599
[45] Date of Patent: Aug. 4, 1998

[54] TAPE MEASURING SQUARE AND ADJUSTABLE TOOL GUIDE

[76] Inventor: Norman L. Clifton, 49 S. 875 West, Orem, Utah 84058-5267

[21] Appl. No.: 594,082

[22] Filed: Jan. 30, 1996

[51] Int. Cl.⁶ .................................................. G01B 3/10
[52] U.S. Cl. .............................. 33/760; 33/770; 33/481
[58] Field of Search .......................... 33/474, 476, 481, 33/759, 760, 766, 770

[56] References Cited

U.S. PATENT DOCUMENTS

| | | |
|---|---|---|
| 2,619,134 | 11/1952 | West. |
| 2,745,447 | 5/1956 | Studley, Jr.. |
| 2,747,625 | 5/1956 | Small. |
| 3,807,269 | 4/1974 | Mertes. |
| 3,811,196 | 5/1974 | Smith. |
| 3,812,587 | 5/1974 | Elkins et al. ................... 33/760 |
| 4,557,170 | 12/1985 | Ingham. |
| 4,574,486 | 3/1986 | Drechsler. |
| 4,745,834 | 5/1988 | Neumann. |
| 5,077,910 | 1/1992 | Smith ........................... 33/760 |
| 5,113,596 | 5/1992 | Meyers ......................... 33/760 |
| 5,197,365 | 3/1993 | Clifton. |
| 5,239,761 | 8/1993 | Wu et al. ...................... 33/760 |
| 5,390,425 | 2/1995 | Gilberts ........................ 33/760 |
| 5,390,426 | 2/1995 | Hull ............................. 33/760 |
| 5,481,810 | 1/1996 | Hastings et al. .............. 33/760 |

*Primary Examiner*—Thomas B. Will
*Attorney, Agent, or Firm*—Thorpe, North & Western, LLP

[57] ABSTRACT

A layout and guide tool in which a coilable tape measure is disposed on a base to serve as a template for marking a workpiece or fashioning the workpiece with a tool. The layout tool has a guide to align the tool with the workpiece so that the integral template is in known orientation to the workpiece, and witness marks from which to read a direct numerical measurement of the distance from the end of the workpiece to the relevant work point or layout point.

16 Claims, 2 Drawing Sheets

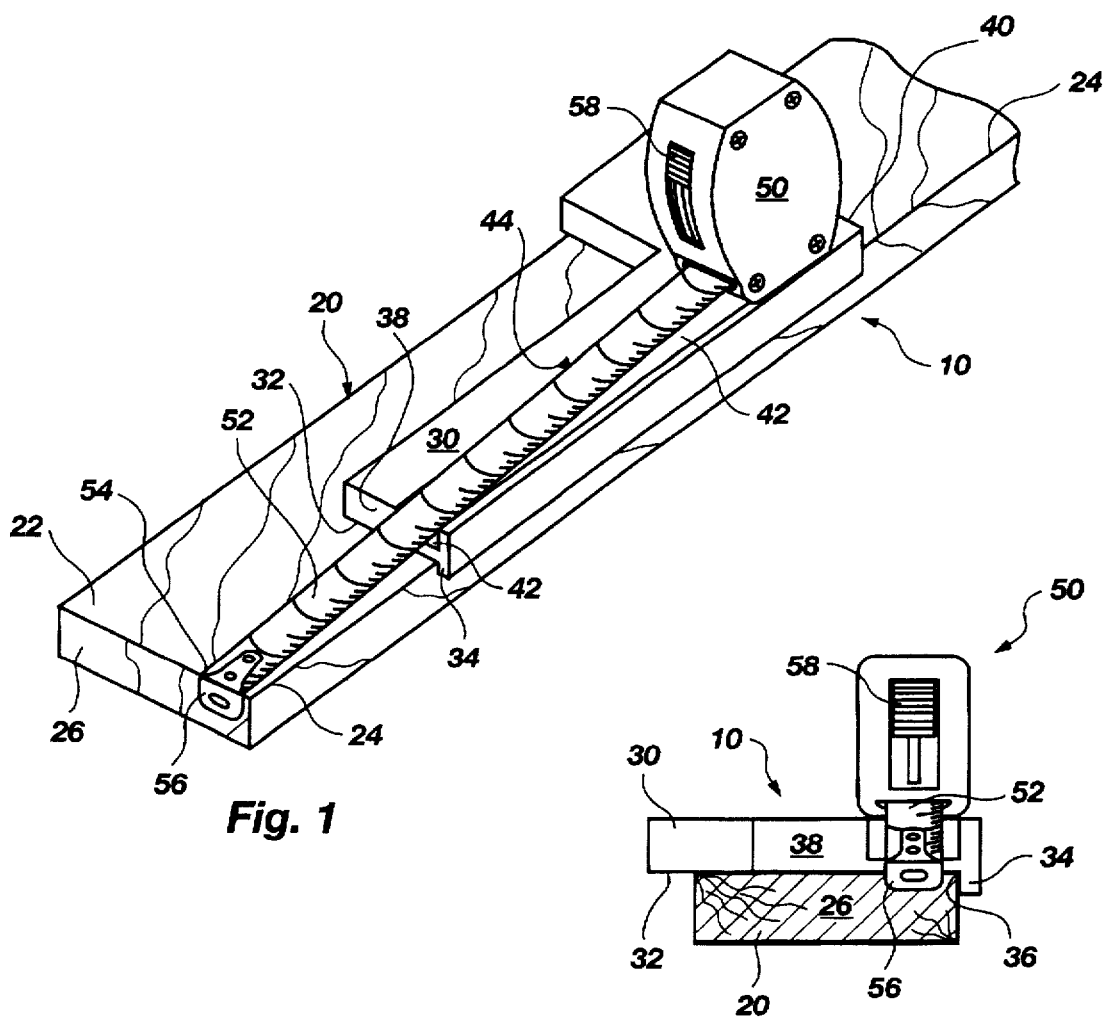
Fig. 1
Fig. 2
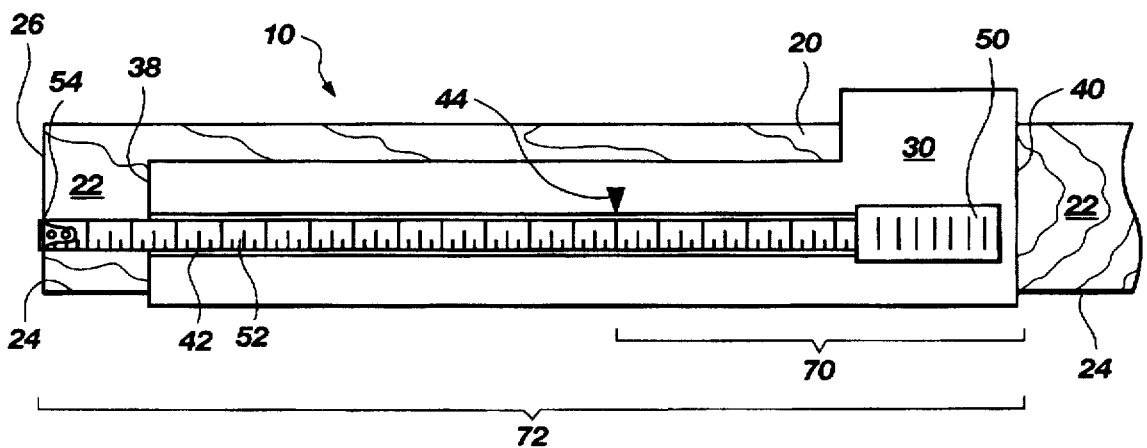
Fig. 3

5,787,599

TAPE MEASURING SQUARE AND ADJUSTABLE TOOL GUIDE

BACKGROUND

1. Field of the Invention.

The present invention relates generally to an apparatus for measuring a workpiece with a coilable tape and providing means for layout markings or a guide for working upon the workpiece.

2. The Background Art and Background of the Invention.

In laying out a workpiece for cutting, routing or the like, it is common to use a tape measure to measure the piece, a square for making a reliable mark, and a tool and tool guide for working upon the piece. For example to make a square cut on a desired length of board, it is necessary to first measure the board.

If the length is more than a foot or two, it is common to use a retracting tape measure in which the length of tape extracted corresponds to the desired length of the workpiece. Such tape measures are significantly more useful for such lengths than rigid measures which are very clumsy in lengths of more than a foot or two. Such tape measures are commonly available in a variety of lengths up to one hundred feet or more. They are also available in a variety of rules, e.g. base units and grossly ruled or highly refined subdivisions. These qualities make the coilable tape measure the tool of choice for such an operation.

It is next necessary to mark the desired length and use a square to make a known alignment with an edge of the board to form a square. The square edge is again marked with such as a pencil to form a guide for sawing the piece. This task may be necessary on more than one edge depending on the available tools for cutting the board. Some tools such as a table saw have means for guiding the saw straight across the intended cut. Other more convenient tools such as a skill saw must either be guided free hand, or with a separate guide.

It will also be appreciated that it is desirable to perform many other similar operations on such a workpiece (for example miter cuts and decorative edges) using an array of tools. These tools include such as hand saws, power saws, drills, routers, planes and the like. Successive measuring, marking and guiding operations are time consuming and involve numerous costly tools and excessive clutter.

There is thus a need to provide a tape measuring square and adjustable tool guide in which the means for measuring, marking and guiding are assembled in such a way as to eliminate clutter, cost and successive steps Those having ordinary skill in the art will appreciate that these and other needs are met by the present invention.

OBJECTS AND SUMMARY OF THE INVENTION

It is therefore an object of the present invention to provide a layout and measuring implement utilizing a conventional coilable tape measure a workpiece and simultaneously provide a template for marking the workpiece.

It is another object of the invention to provide such a layout and measuring implement in which the template forms a template suitable for fashioning a workpiece.

It is an additional object of the invention to provide such layout and measuring implement in which the reading at a witness mark reads the actual distance from the end of the workpiece to the intended point of working upon the workpiece.

The above objects and others not specifically recited are realized in specific illustrative embodiments of a layout and measuring implement in which a coilable measure is attached to a base which serves a guide to the uncoiled portion of tape and a template for marking or fashioning a workpiece. The tape indicates the distance from the end of the workpiece to the template at a witness mark on the base.

In another illustrative embodiment of a layout and measuring implement the witness point is adjustable to compensate for a varying distances from the template to the work point, such that the tape reads the actual distance between the end of the workpiece and the work point.

In yet another illustrative embodiment of a layout and measuring implement the template is adjustable to layout or guide angled work upon the workpiece.

BRIEF DESCRIPTION OF THE DRAWINGS

The above and other objects, features and advantages of the invention will become apparent from a consideration of the subsequent detailed description presented in connection with the accompanying drawings in which:

FIG. 1 is a perspective view of a tape measuring square and adjustable tool guide made in accordance with the principles of the present invention;

FIG. 2 is an end view of the tape measuring square and adjustable tool guide of FIG. 1;

FIG. 3 is a top view of the tape measuring square and adjustable tool guide of FIG. 1;

DETAILED DESCRIPTION OF THE PREFERRED EMBODIMENT OF THE PRESENT INVENTION

Figure 4:
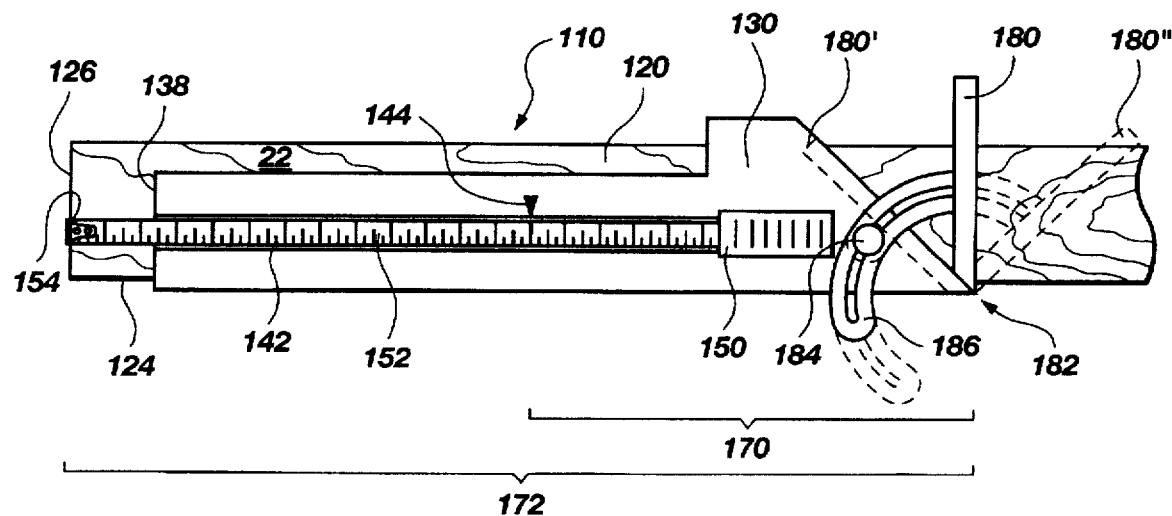
FIG. 4 is a top view of a second presently preferred embodiment of a tape measuring square and adjustable tool guide having an adjustable template; and, FIG. 5 is a side view of a third presently preferred embodiment of a tape measuring square and adjustable tool guide having a template which serves as a guide for a fashioning tool.

Reference will now be made to the drawings wherein like structures will be provided with like reference numerals.

Referring to FIGS. 1–3, there is shown, generally designated at 10, a tape measuring square and adjustable tool guide in conjunction with a workpiece 20. The tape measuring square and adjustable tool guide is generally comprised of an elongate base 30, and a coilable tape measure 50.

The elongate base has a lower surface 32 which rests on the upper surface 22 of the workpiece 20 during layout and measuring operations. A guide is formed from a flange 34 extending downwardly below the lower surface 32 of the base 30 to form an inside corner 36, FIG. 2, for receiving a complementary outside corner 24 of the workpiece 20. The inside corner 36 of the base 30 runs substantially the length of the base and allows the tape measuring square 10 to be aligned with the length of the workpiece 20 in a predictably parallel relationship.

The base 30 has a first end 38 and second end 40 formed opposite each other separated by the length of the base. The base 30 has a channel 42 running from the first end 38 to the coilable tape measure 50. The coilable tape measure 50 has a length of tape coiled, a portion of which is uncoiled 52 and ready for use. The uncoiled portion of tape 52 is disposed within and aligned to the channel 42 of the base 30. The uncoiled portion 52 of the coilable tape measure 50 has a terminus 54 to which is attached a hook 56. The hook 56 rests against the first end 38 of the elongate base 30 when the uncoiled portion of tape 52 is not extended to measure a workpiece 20. The coil-action on the tape measure 50 has a breaking apparatus engaged by a brake button 58, such that the coil action can be selective locked in place. Rule markings are made on at least the upper side of the tape and are depicted on the uncoiled portion 52 of the coilable tape measure 50. It will be appreciated that these markings can be in a variety of units and any level of precision. The coilable tape measure 50 and related structure 52-58 will be readily recognized as an apparatus in wide circulation, with a variety of configurations readily available in the marketplace.

It will be appreciated that a case of the coilable tape measure 50, can be formed of two halves about a midline, said case is typically molded plastic material. The coilable tape measure 50 can be attached to the base 30 using adhesive or mechanical fasteners in any number of modes. In the depicted embodiment, the tape measure 50 is glued to the base 30 using a suitable adhesive. The tape measure 50 may also be formed integrally with the base 30, by molding two halves from complementary or identical material, such as injection molded plastic, and fastening those halves together with a tape-coil apparatus therein.

The second end 40 of the base 30 is a rigid straight edge suitable for serving as a template for making a mark upon the workpiece 20 with such as a pencil, pen, awl, knife or the like (not depicted). The second end or template 40 is at right angles with the length of the base 30, which is parallel to the outside corner 24 of workpiece 20. Thus any mark made along the template 40 is perpendicular to the corner 24. The utility of this will be appreciated by those of ordinary skill. Useful variations to perpendicular lines and inscribing a mark will be described momentarily.

It will also be appreciated that making such a mark at a known distance from an end 26 of the workpiece 20 is also useful when laying out such workpiece. The tape 50 is highly useful when performing such a measuring and marking operation. Only the necessary amount of tape is uncoiled 52 from the tape proper 50. As is set forth above, this obviates the use of cumbersome rigid apparatus to perform this function. A witness mark 44 is disposed on the base 30 adjacent the channel 42 (which is also adjacent one edge of the uncoiled portion of tape 52 within the channel 42). The tape 50 is rigidly attached or integrally formed at a known distance from the template 40. Because of the rigid attachment or integral formation, the witness mark 44 is also a know distance 70 from the template 40. This makes it possible to add distance 70 to the actual reading of ruled distance from the terminus 54 of the tape when the portion of uncoiled tape 52 is extended to the end 26 of the workpiece 20, to calculate a reading of the distance 72 from the end of the workpiece 26 to the template 40. In other words, the distance 72 is the reading adjacent the witness mark 44 plus distance 70. If the actual reading was 12" and the distance 70 was 6", the distance 72 would be 18".

It is even more desirable in the presently preferred embodiment to begin the ruling at the terminus 54 with numbering minus distance 72 such that the reading at the witness mark 44 is the numerical equivalent of distance 72. For example, the distance 70 is 200 mm, the ruling at the terminus 38 begins at 200 mm, the distance 72 is 500 mm, thus the actual numerical reading on the uncoiled portion of tape 52 adjacent the witness mark 44 would be 500 mm. In this manner, it is now possible to make a layout mark at a known, easily readable distance from the end of a workpiece with one tool comprising a coilable tape measure 50, a base 30 easily alignable with the workpiece and a template 40.

It will be appreciated that the locking button 58 of the tape measure 50, can be used to fix the portion of uncoiled tape 52. This is useful as well to fix the base 30 and template 40 at a given distance from end 26 of the workpiece 20, at least to keep the layout rigid in the direction at which the tape portion 52 is in tension. This is desirable for layout and marking purpose as well as for using the template as a guide for equipment to fashion the workpiece 20, that will be explained momentarily.

Depicted in FIG. 4, is a second presently preferred embodiment of a tape measuring square and adjustable tool guide, generally designated at 110, in which like numbers (plus one hundred) to FIGS. 1-3 are used. The tape measuring square and adjustable tool guide of FIG. 4 further comprises an adjustable template 180. Said template 180 is rotatable on a pivot 182, such that the angle of orientation of the template 180 is variable with respect to the base 130 (and, hence, the workpiece 120).

In this embodiment such angle of orientation is adjustable from 45° (depicted in ghost at 180') from the line formed at the outside corner 24 of the workpiece 120, to 135° from that line (depicted in ghost at 180"). This adjustment is made by loosening a thumbscrew 184, which frictionally engages a radial guide 186 with the upper surface of the base 130. It will be appreciated that this radial guide 186 can have rules thereon to read the angle of radius with respect to the base 130, in accordance with a desired level precision.

Instead of measuring the entire length of the template (FIGS. 1-3, No. 40), the measured distance is from the end 126 of the workpiece to the pivot 182, which remains a fixed distance from relevant structure, unless it is oriented at 90° from the line of the workpiece. Thus, all calculations as set forth above must be made to template edge of the pivot 182. It is, therefore desirable to orient the tape 150 and channel 142 close to the edge of the base 130 near the pivot 182, so that measurements can be made from the corresponding edge of the workpiece.

Figure 5:
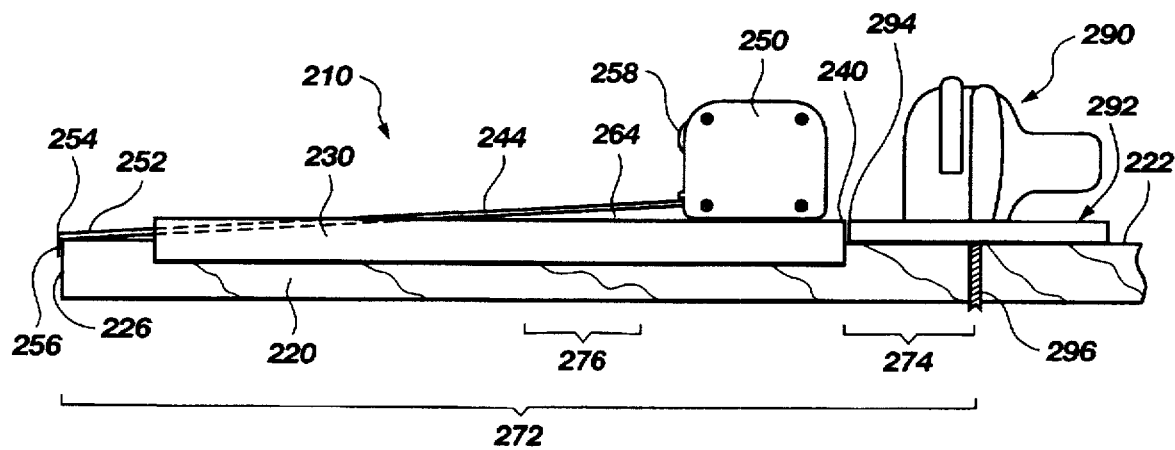

Depicted in FIG. 5, is a third presently preferred embodiment of a tape measuring square and adjustable tool guide, generally designated at 210, in which like numbers (plus two hundred) to FIGS. 1-3 are used. The tape measuring square and adjustable tool guide of FIG. 5 is shown in combination with a fashioning tool 290 and further comprises a second witness mark 264.

It will be appreciated the fashioning tool 290 could be any tool for cutting or otherwise fashioning the workpiece having analogous structure to that momentarily described. In this presently preferred embodiment the fashioning tool is described as a power saw 290. The power saw has a base 292 for following the upper surface 222 of the workpiece 220. The power saw 290 also has a guide edge 294 and a blade 296. The guide edge 294 is generally constructed for following a linear template, thus making cuts of a known and corresponding dimension. In this case the template 240 of the elongate base 230 is adapted to serve as such a guide.

The blade 296 rotates and cuts the work piece 220. The blade is a fixed distance 274 from the template 240 when the guide edge 290 is against the template. This distance 274 represents the difference in distance from the end 226 of the work piece 220 to the template 240. As is fully set forth above, the relevant measured distance (FIGS. 3, No. 72) is that from the end 226 of the work piece 220 to the template 240. Thus that distance must be accounted for in this configuration to calculate the new relevant distance 272 from the end 226 of the work piece 220, to the cut made by the blade 296. This is accomplished by a second witness mark 264 placed a distance 276 which corresponds to distance 274. Thus, the reading at the second witness mark 264 numerically corresponds to the relevant distance 272.

It will be appreciated that distance 274 varies from one fashioning tool to the next. Thus, it is desirable that the second witness mark be readily adjustable to vary with distance 274. This can be accomplished by a surface upon the elongate base 230 which can be written upon and erased, by frictionally fitting the second witness mark 264 to the elongate base 230 to travel through a range of variables, fitting the second witness mark to the elongate base 230 with a guide and thumb screw as in FIG. 4, Nos. 184 and 186, or any other means known to those skilled.

It will be appreciated that the template 240 can be as in No. 40 of FIGS. 1–3, No. 140 of FIG. 4 or circumscribed in a variety of configurations adapted to comport with various guide edges. In this case the template 240 is linear. But, for example with a router (not depicted), it may desirable to have a curved edge adaptable to guide a curved edge of the router guide edge in a curved path to fashion the work piece with a curved design.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A layout and measuring implement comprising:
   an elongate base having a first end and a second end, said second end including a first guide;
   a tool defining a work point spaced a distance from said first guide;
   a first witness mark and a second witness mark associated with the elongate base;
   means for aligning the base with a workpiece;
   a coilable tape measure having rule markings indicating distance and having a terminus, said tape measure mounted on the elongate base near the second end such that the terminus may be pulled toward and beyond the first end to vary in distance from the second end, and released to recoil such that the rule markings are positioned adjacent said first and second witness marks at least when the terminus is pulled beyond the first and second witness marks, said rule markings adjacent said first witness mark comprising an actual numerical reading of the distance between said terminus and said first guide and said markings adjacent said second witness mark comprising an actual numerical reading of the distance between said terminus and said work point.

2. A layout and measuring implement as in claim 1 wherein the alignment means comprises a flange extending downwardly from the elongate base to engage the base in a parallel relationship to an edge of the workpiece.

3. A layout and measuring implement as in claim 1 wherein said first guide forms a template for marking the workpiece.

4. A layout and measuring implement as in claim 3 wherein the template forms a straight edge substantially perpendicular to one edge of the work piece.

5. A layout and measuring implement as in claim 1, further including a second guide for said tool, said second guide engaging said first guide.

6. A layout and measuring implement as in claim 5 wherein said second witness mark is adjustable to compensate for the distance between the second guide and the work point such that the markings adjacent said second witness mark comprise an actual numerical reading of the distance between the terminus and the work point.

7. A layout and measuring implement as in claim 1 wherein said first guide comprises an adjustable template pivotally mounted to the second end and angularly adjustable relative thereto.

8. A layout and measuring implement as in claim 1 wherein said first guide is pivotally mounted to the second end and angularly adjustable relative thereto.

9. A layout and measuring implement comprising:
   an elongate base having a first end and a second end and an alignment guide for aligning the base with the edge of a workpiece;
   a tool defining a work point spaced a distance from said second end a first witness mark and a second witness mark associated with the elongate base;
   a coilable tape measure having a body mounted on the base near the second end and a length of tape coiled on the body, said tape further comprising sequentially numbered rule markings, a terminus which is extendable from the body in variable distances, and a hook mounted on the terminus, the rule markings being positioned adjacent said first and second witness marks at least when the terminus is extended beyond the first and second witness marks, said rule markings adjacent said first witness mark comprising an actual numerical reading of the distance between said terminus and said second end and said rule markings adjacent said second witness mark comprising an actual numerical reading of the distance between said terminus and said work point;
   a channel extending lengthwise along an upper surface of the base from substantially the first end to the second end in alignment with the position of the coilable tape measure body such that an uncoiled portion of tape runs within the channel substantially parallel to the base in the direction of the first end.

10. A layout and measuring implement as in claim 9 wherein the alignment guide comprises a flange extending downwardly from the elongate base to engage the base in a substantially parallel relationship to the edge of the workpiece.

11. A layout and measuring implement as in claim 9 further including a template forming a straight edge substantially perpendicular to an edge of the work piece, said rule markings adjacent said first witness mark comprise an actual numerical reading of the distance between the terminus and said template.

12. A layout and measuring implement as in claim 9, wherein said second end includes a guide for said tool.

13. A layout and measuring implement as in claim 12 wherein the tool has a guide edge and wherein said guide edge is in sliding engagement with said guide.

14. A layout and measuring implement as in claim 13 wherein said second witness mark is adjustable to compensate for a distance between the guide edge and the work point such that the markings adjacent the second witness mark comprise an actual numerical reading of the distance between the terminus and the work point.

15. A layout and measuring implement as in claim 11 wherein the template is adjustably mounted to the second end and angularly adjustable relative thereto.

16. A layout and measuring implement as in claim 12 wherein the guide is adjustably mounted to the second end and angularly adjustable relative thereto.

* * * * *